(12) United States Patent
Steel et al.

(10) Patent No.: US 8,814,373 B2
(45) Date of Patent: Aug. 26, 2014

(54) REARVIEW DEVICE SUPPORT ASSEMBLY

(75) Inventors: Robert Steel, Coventry (GB); Mark R. Roth, Coloma, MI (US); Danny L. Minikey, Jr., Fenwick, MI (US)

(73) Assignee: Gentex Corporation, Zeeland, MI (US)

( * ) Notice: Subject to any disclaimer, the term of this patent is extended or adjusted under 35 U.S.C. 154(b) by 231 days.

(21) Appl. No.: 13/402,701

(22) Filed: Feb. 22, 2012

(65) Prior Publication Data

US 2012/0218655 A1 Aug. 30, 2012

Related U.S. Application Data

(60) Provisional application No. 61/447,478, filed on Feb. 28, 2011.

(51) Int. Cl.
*G02B 5/08* (2006.01)
*B60R 1/12* (2006.01)
*B60R 1/04* (2006.01)

(52) U.S. Cl.
CPC .... *B60R 1/04* (2013.01); *B60R 1/12* (2013.01)
USPC .......................................................... 359/871

(58) Field of Classification Search
USPC ................................................. 359/838–883
See application file for complete search history.

(56) References Cited

U.S. PATENT DOCUMENTS

| | | |
|---|---|---|
| 5,096,287 A | 3/1992 | Kakinami et al. |
| 5,439,305 A | 8/1995 | Santo |
| 5,504,478 A | 4/1996 | Knapp |
| 5,537,003 A | 7/1996 | Bechtel et al. |
| 5,666,028 A | 9/1997 | Bechtel et al. |
| 5,796,094 A | 8/1998 | Schofield et al. |
| 5,971,553 A | 10/1999 | Durnwald |
| 6,008,486 A | 12/1999 | Stam et al. |
| 6,087,953 A | 7/2000 | DeLine et al. |
| 6,102,546 A | 8/2000 | Carter |
| 6,130,421 A | 10/2000 | Bechtel et al. |
| 6,130,448 A | 10/2000 | Bauer et al. |
| 6,140,933 A | 10/2000 | Bugno et al. |
| 6,172,613 B1 | 1/2001 | DeLine et al. |
| 6,222,460 B1 | 4/2001 | DeLine et al. |
| 6,313,457 B1 | 11/2001 | Bauer et al. |
| 6,326,900 B2 | 12/2001 | DeLine et al. |
| 6,359,274 B1 | 3/2002 | Nixon et al. |
| 6,366,213 B2 | 4/2002 | DeLine et al. |
| 6,367,939 B1 | 4/2002 | Carter et al. |
| 6,396,446 B1 | 5/2002 | Walstra et al. |
| 6,403,942 B1 | 6/2002 | Stam |
| 6,420,800 B1 | 7/2002 | LeVesque et al. |
| 6,431,712 B1 | 8/2002 | Turnbull |

(Continued)

FOREIGN PATENT DOCUMENTS

| | | |
|---|---|---|
| CN | 201457300 U | 5/2010 |
| EP | 0937601 A2 | 8/1999 |

(Continued)

*Primary Examiner* — Jennifer L. Doak
(74) *Attorney, Agent, or Firm* — Price Heneveld LLP; Scott P. Ryan

(57) ABSTRACT

An interior rearview device support assembly having a support member including a connecting end and a pivot end. A rearview device housing defines an internal cavity and includes a socket. The pivot end of the support member is coupled with the socket and is pivotable relative thereto. A sensor device is disposed inside the rearview device housing and is coupled to the support member.

20 Claims, 5 Drawing Sheets

(56) References Cited

U.S. PATENT DOCUMENTS

| | | |
|---|---|---|
| 6,465,963 B1 | 10/2002 | Turnbull et al. |
| 6,471,362 B1 | 10/2002 | Carter et al. |
| 6,483,438 B2 | 11/2002 | DeLine et al. |
| D470,089 S | 2/2003 | Hook et al. |
| 6,539,306 B2 | 3/2003 | Turnbull |
| 6,593,565 B2 | 7/2003 | Heslin et al. |
| 6,614,911 B1 | 9/2003 | Bryson et al. |
| 6,617,564 B2 | 9/2003 | Ockerse et al. |
| 6,621,616 B1 | 9/2003 | Bauer et al. |
| 6,631,316 B2 | 10/2003 | Stam et al. |
| 6,642,851 B2 | 11/2003 | Deline et al. |
| 6,653,831 B2 | 11/2003 | Friend et al. |
| 6,670,207 B1 | 12/2003 | Roberts |
| 6,679,608 B2 | 1/2004 | Bechtel et al. |
| 6,696,935 B2 | 2/2004 | Bonardi et al. |
| 6,774,810 B2 | 8/2004 | DeLine et al. |
| 6,774,988 B2 | 8/2004 | Stam et al. |
| 6,861,809 B2 | 3/2005 | Stam |
| 6,963,437 B2 | 11/2005 | Bauer et al. |
| 6,980,092 B2 | 12/2005 | Turnbull et al. |
| 7,012,543 B2 | 3/2006 | DeLine et al. |
| 7,019,275 B2 | 3/2006 | Stam et al. |
| 7,023,379 B2 | 4/2006 | Turnbull |
| 7,064,882 B2 | 6/2006 | Tonar et al. |
| 7,118,931 B2 | 10/2006 | Roberts |
| 7,120,261 B1 | 10/2006 | Turnbull et al. |
| 7,149,627 B2 | 12/2006 | Ockerse et al. |
| 7,266,204 B2 | 9/2007 | Watson et al. |
| 7,293,901 B2 | 11/2007 | Tuttle et al. |
| 7,306,355 B2 | 12/2007 | Walser et al. |
| 7,324,261 B2 | 1/2008 | Tonar et al. |
| 7,327,226 B2 | 2/2008 | Turnbull et al. |
| 7,349,143 B2 | 3/2008 | Tonar et al. |
| 7,372,611 B2 | 5/2008 | Tonar et al. |
| 7,379,225 B2 | 5/2008 | Tonar et al. |
| 7,404,655 B2 | 7/2008 | Walser et al. |
| 7,417,221 B2 | 8/2008 | Creswick et al. |
| 7,423,821 B2 | 9/2008 | Bechtel et al. |
| 7,447,320 B2 | 11/2008 | Bryson et al. |
| 7,452,113 B2 | 11/2008 | Newton et al. |
| 7,468,651 B2 | 12/2008 | DeLine et al. |
| 7,477,439 B2 | 1/2009 | Tonar et al. |
| 7,488,083 B2 | 2/2009 | Hoek et al. |
| 7,488,099 B2 | 2/2009 | Fogg et al. |
| 7,511,872 B2 | 3/2009 | Tonar et al. |
| 7,543,946 B2 | 6/2009 | Ockerse et al. |
| 7,565,006 B2 | 7/2009 | Stam et al. |
| 7,567,291 B2 | 7/2009 | Bechtel et al. |
| 7,570,413 B2 | 8/2009 | Tonar et al. |
| 7,602,542 B2 | 10/2009 | Tonar et al. |
| 7,612,929 B2 | 11/2009 | Tonar et al. |
| 7,667,579 B2 | 2/2010 | DeLine et al. |
| 7,683,326 B2 | 3/2010 | Stam et al. |
| 7,700,906 B2 | 4/2010 | Stam et al. |
| 7,719,750 B2 | 5/2010 | Tonar et al. |
| 7,728,721 B2 | 6/2010 | Schofield et al. |
| 7,746,535 B2 | 6/2010 | Kelley et al. |
| 7,881,839 B2 | 2/2011 | Stam et al. |
| 7,887,204 B2 | 2/2011 | Zhao |
| 7,888,629 B2 | 2/2011 | Heslin et al. |
| 7,978,393 B2 | 7/2011 | Tonar et al. |
| 8,004,741 B2 | 8/2011 | Tonar et al. |
| 8,070,329 B1 | 12/2011 | Bechtel et al. |
| 8,144,223 B2 | 3/2012 | Van Blerkom et al. |
| 8,169,684 B2 | 5/2012 | Bugno et al. |
| 2004/0164228 A1 | 8/2004 | Fogg et al. |
| 2004/0201483 A1 | 10/2004 | Stam et al. |
| 2004/0230358 A1 | 11/2004 | Stam et al. |
| 2005/0152054 A1 | 7/2005 | Rumsey et al. |
| 2006/0016965 A1 | 1/2006 | Stam et al. |
| 2006/0106518 A1 | 5/2006 | Stam et al. |
| 2007/0041110 A1 | 2/2007 | Hoek et al. |
| 2007/0171037 A1* | 7/2007 | Schofield et al. ............ 340/438 |
| 2007/0291962 A1 | 12/2007 | Watson et al. |
| 2008/0049848 A1 | 2/2008 | Turnbull et al. |
| 2009/0010494 A1 | 1/2009 | Bechtel et al. |
| 2009/0046870 A1 | 2/2009 | Turnbull |
| 2009/0097674 A1 | 4/2009 | Watson et al. |
| 2009/0190015 A1 | 7/2009 | Bechtel et al. |
| 2009/0303566 A1 | 12/2009 | Tonar et al. |
| 2010/0073480 A1 | 3/2010 | Hoek et al. |
| 2010/0117815 A1 | 5/2010 | DeLine et al. |
| 2010/0124339 A1 | 5/2010 | Turnbull et al. |
| 2010/0150374 A1 | 6/2010 | Bryson et al. |
| 2010/0187407 A1 | 7/2010 | Bechtel et al. |
| 2010/0195226 A1 | 8/2010 | Heslin et al. |
| 2010/0246017 A1 | 9/2010 | Tonar et al. |
| 2010/0321328 A1 | 12/2010 | Chang et al. |
| 2010/0321758 A1 | 12/2010 | Bugno et al. |
| 2011/0317242 A1 | 12/2011 | Tonar et al. |
| 2012/0027241 A1 | 2/2012 | Turnbull et al. |

FOREIGN PATENT DOCUMENTS

| | | |
|---|---|---|
| EP | 1731365 A1 | 12/2006 |
| JP | 2002504038 A | 2/2002 |
| KR | 20080048574 A | 6/2008 |
| RU | 2381629 C2 | 2/2010 |
| WO | 2004005073 A2 | 1/2004 |

* cited by examiner

US 8,814,373 B2

REARVIEW DEVICE SUPPORT ASSEMBLY

CROSS-REFERENCE TO RELATED APPLICATION

This application claims the benefit of and priority to U.S. Provisional Patent Application No. 61/447,478, filed on Feb. 28, 2011, entitled "REARVIEW DEVICE SUPPORT ASSEMBLY," the disclosure of which is hereby incorporated herein by reference in its entirety.

BACKGROUND OF THE INVENTION

The present invention generally relates to a rearview device support assembly, and more specifically, to a rearview device support assembly configured to support a variety of devices in a static position, while maintaining movability of a rearview device.

SUMMARY OF THE INVENTION

One aspect of the present invention includes an interior rearview device support assembly having a support member including a connecting end and a pivot end. A rearview device housing defines an internal cavity and includes a socket. The pivot end of the support member is coupled with the socket and is pivotable relative thereto. A sensor device is disposed inside the rearview device housing and is coupled to the support member.

Another aspect of the present invention includes an interior rearview device support assembly having a support member fixedly connected to a light sensor device. A rearview device housing defines an internal cavity and includes a socket. The support member is operably connected with the socket and is pivotable relative thereto. The light sensor device is disposed in the rearview device housing. A viewing window is disposed in the rearview device housing, such that the light sensor device can retrieve image data from outside the rearview device housing.

Yet another aspect of the present invention includes an interior rearview device support assembly having a support member including a connecting end and a pivot end. A light sensor device is operably connected to the support member proximate the pivot end. A rearview device housing includes a socket moveably coupled with the pivot end. The pivot end of the support member and the light sensor device is disposed inside the rearview device housing. The rearview device housing is rotatable horizontally at approximately 8 degrees. A viewing window is disposed in the rearview device housing proximate the light sensor device. A coverplate is disposed over the viewing window.

These and other aspects, objects, and features of the present invention will be understood and appreciated by those skilled in the art upon studying the following specification, claims, and appended drawings.

DETAILED DESCRIPTION OF EMBODIMENTS

Figure 1:
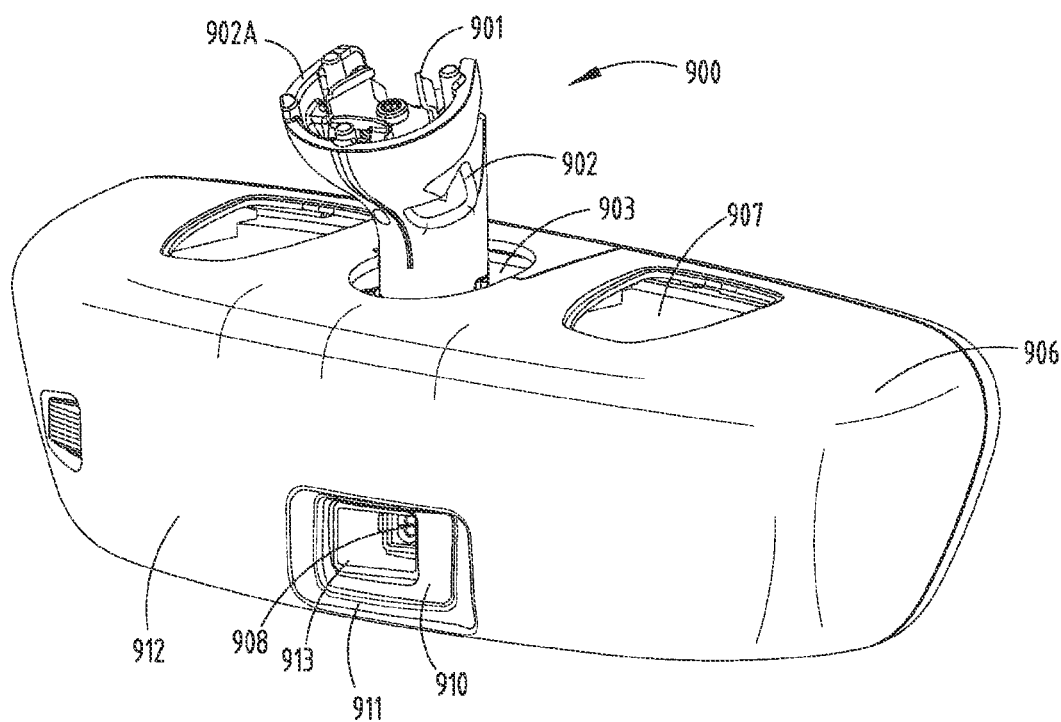
FIG. 1 is a rear perspective view of a rearview device support assembly of the present invention.
Figure 2:
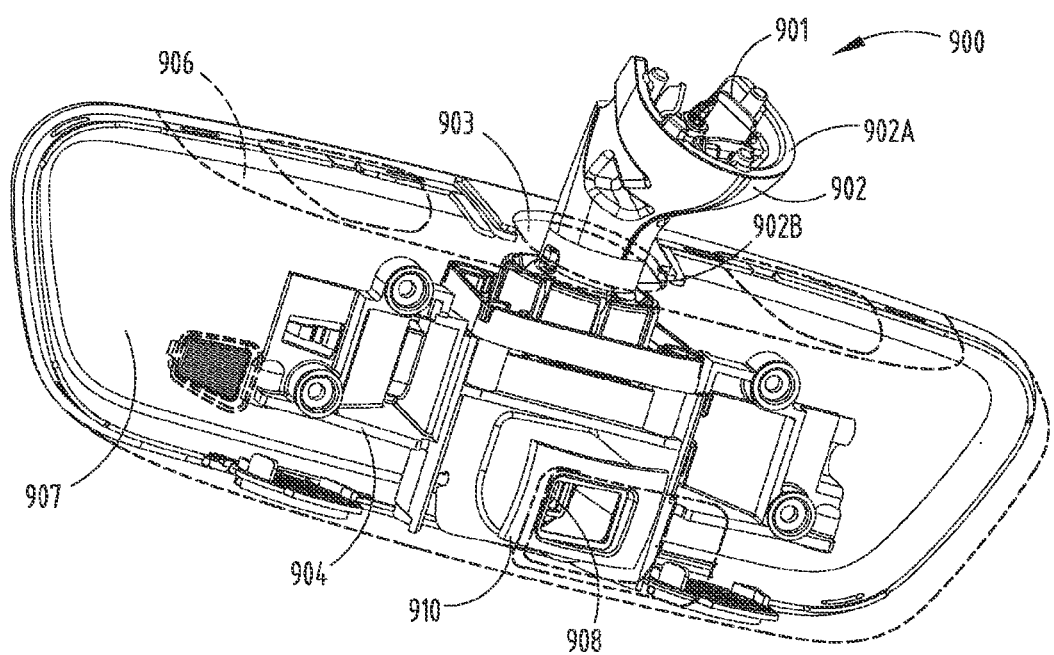
FIG. 2 is a rear perspective view of the rearview device support assembly of FIG. 1 with a portion of the housing removed.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

Figure 3:
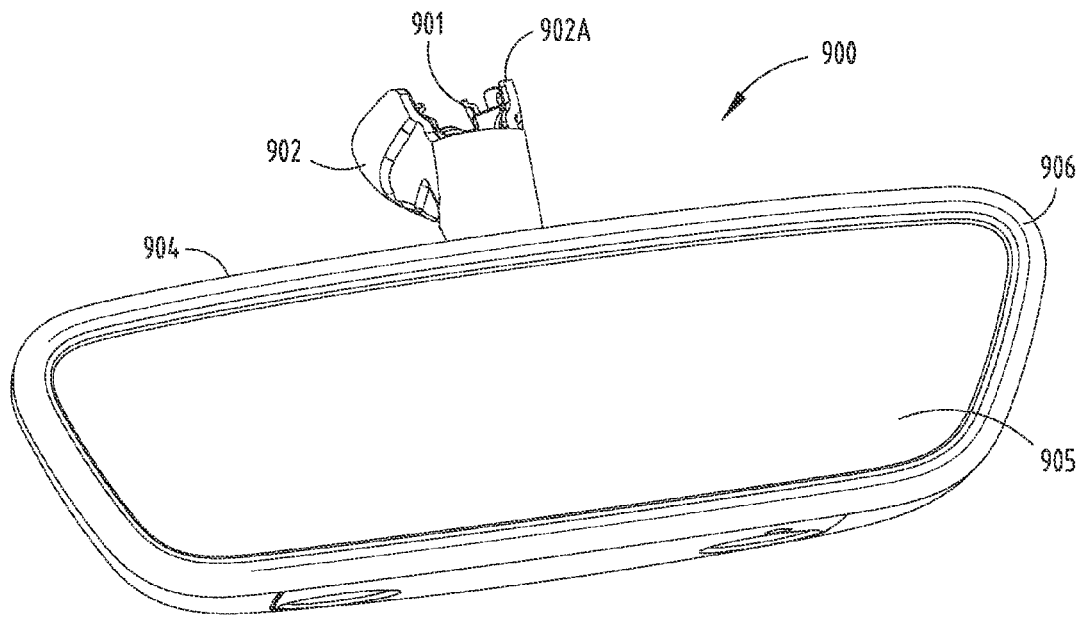
FIG. 3 is a front perspective view of the rearview device support assembly of FIG. 1.
Figure 3A:
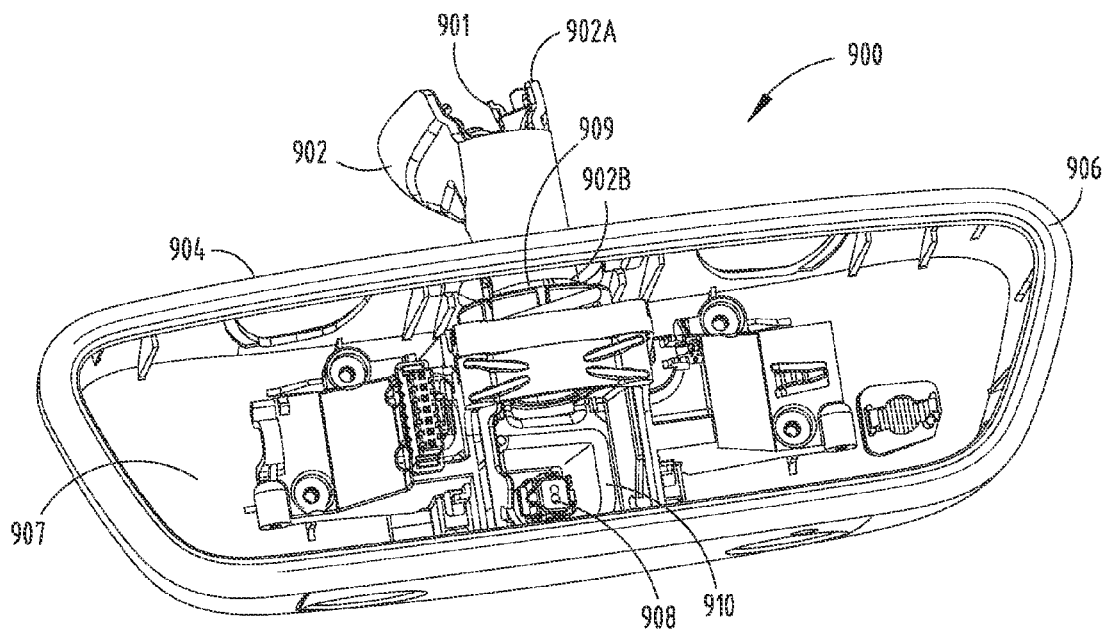
FIG. 3A is a front perspective view of the rearview device support assembly of FIG. 1 with the rearview device removed.
Figure 4:
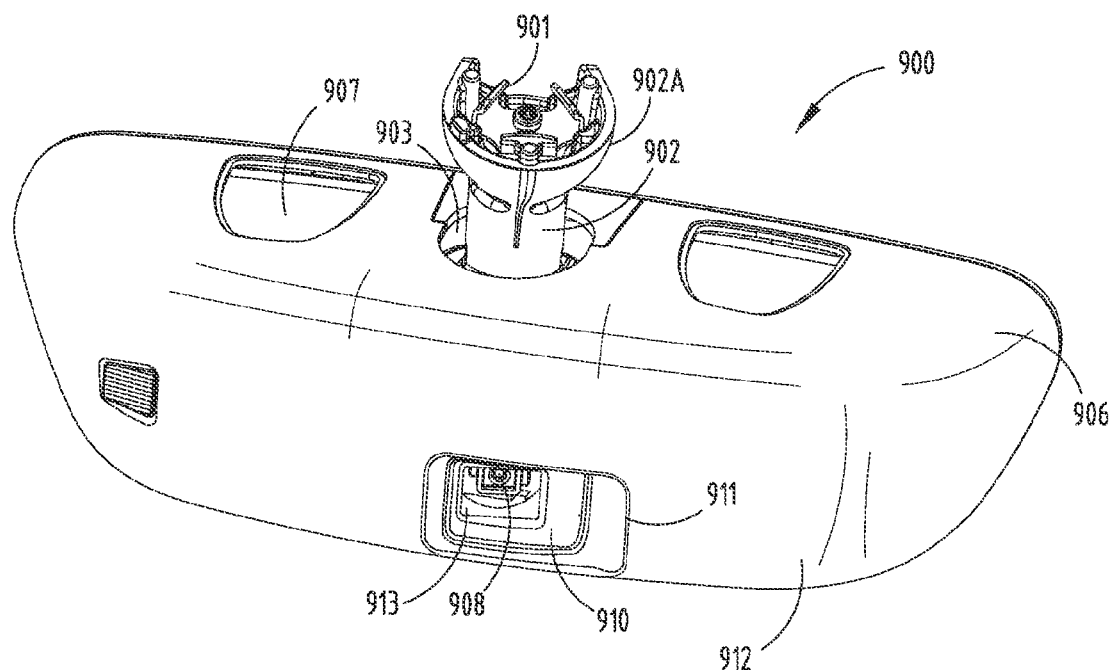
FIG. 4 is a top perspective view of the rearview device support assembly of FIG. 1.

Referring to FIGS. 1-4, the reference numeral 900 generally designates a rearview device support assembly having a support member 902 including a connecting end 902A and a pivot end 902B. A rearview device housing 906 defines an internal cavity 907 and includes a socket 909. The pivot end 902B of the support member 902 is operably connected with the socket 909 and is pivotable relative thereto. A sensor device 908 is disposed in the internal cavity 907 (FIG. 3A) and is operably connected to the support member 902.

As illustrated in FIGS. 1-4, the rearview device support assembly 900 includes a mount 901 attachable to a windshield or header assembly and adapted for engagement with the support member 902, which is adapted to directly support a rearview device assembly 904 (FIG. 2) or the rearview device housing 906. The rearview device assembly 904 generally includes a rearview device 905 (FIG. 3) that provides a rearward view to a driver.

The mount 901 is interchangeable to accommodate a user's preference in mounting constructions. This interchangeable mount interface also allows a user to remove the entire rearview device support assembly 900 and install the entire rearview device support assembly 900 in another vehicle. The support member 902 may extend down through a top portion of the rearview device housing 906 or through a rear portion of the rearview device housing 906 through an aperture 903. The aperture 903 is larger than the width of the support member 902. The support member 902 also includes the light sensor device 908 and a light sensor device housing 910 (FIG. 1) operably coupled with the support member 902 and disposed inside the rearview device assembly 904. It is contemplated that the light sensor device 908 and the light sensor device housing 910 may be initially movable relative to the support member 902, but during operation, would be placed in a fixed condition, such that the light sensor device housing 910 does not move relative to the support member 902, but that the rearview device housing 906 could move relative to both the support member 902 and the light sensor device housing 910 and the light sensor device 908. Thus, the rearview device 905, such as a mirror, positioned in the internal cavity 907 can be adjusted relative to the support member 902 without affecting the position of the light sensor device housing 910 or the light sensor device 908.

Figure 5:
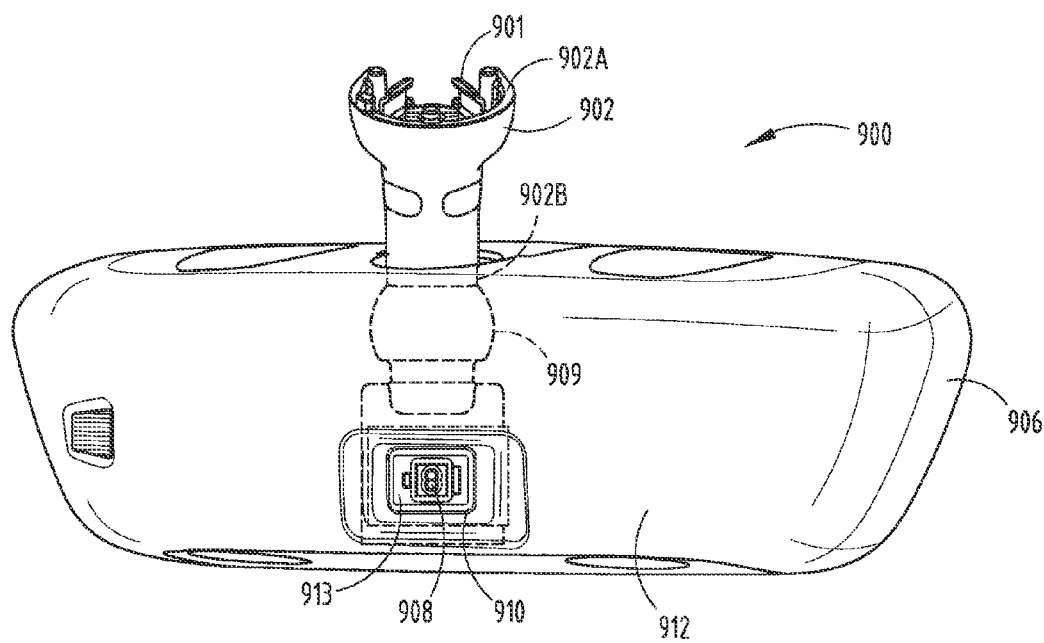
FIG. 5 is a front elevational view of the rearview device support assembly of FIG. 1 with the rearview device support assembly disposed at a clockwise stop position.
Figure 6:
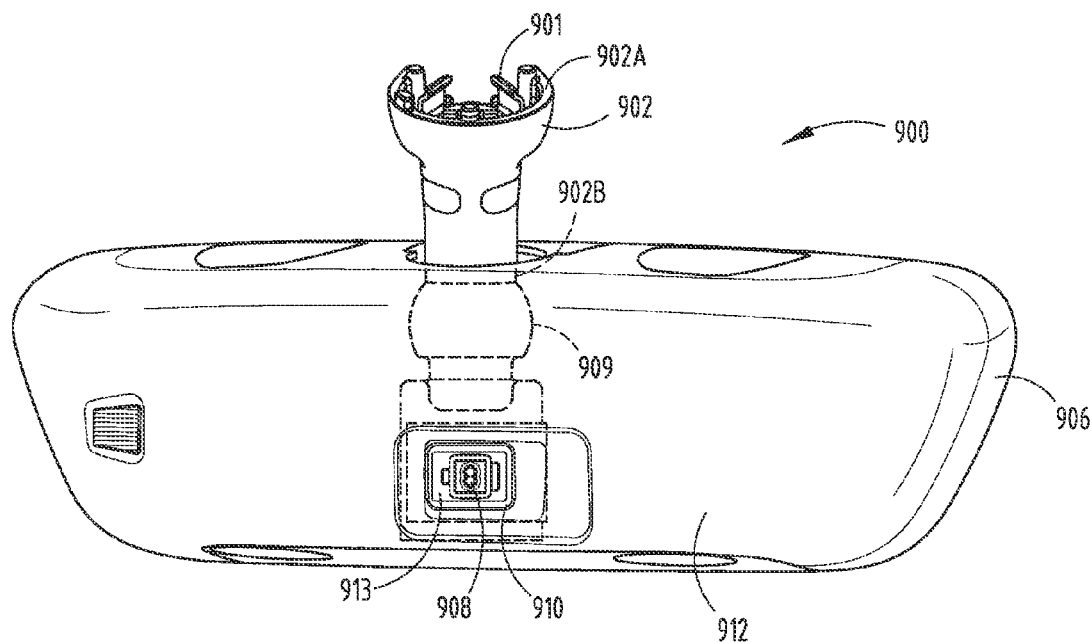
FIG. 6 is a front elevational view of the rearview device support assembly of FIG. 1 with the rearview device support assembly disposed at a counter-clockwise stop position.
Figure 6A:
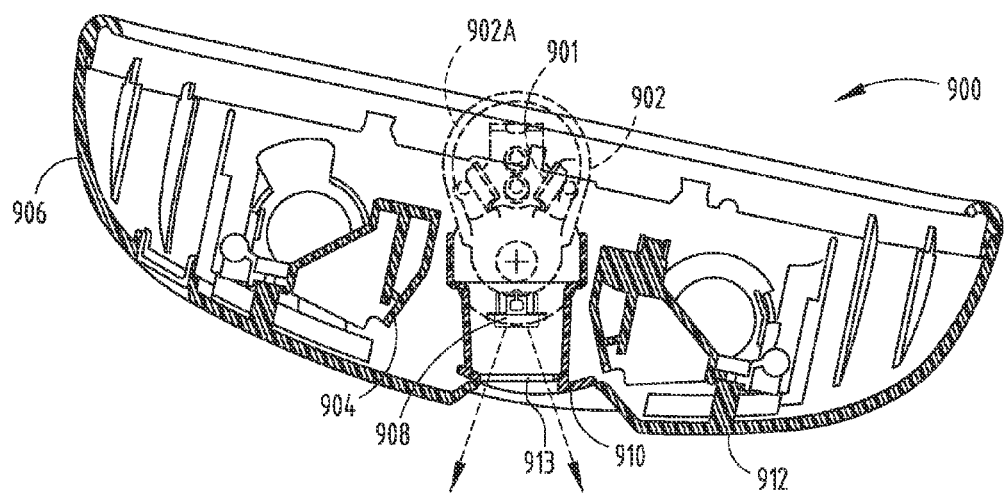
FIG. 6A is a top plan cross-sectional view of the rearview device support assembly of FIG. 6.

As illustrated in FIGS. 5-6A, the light sensor device 908 is offset laterally from the center of the rearview device assembly 904. The forward line of sight of the light sensor device 908 is angled relative to the longitudinal extent of the rearview device housing 906. In operation, the forward line of sight of the light sensor device 908 will extend forward from a vehicle in which the rearview device support assembly 900 is installed substantially parallel with the longitudinal extent of the vehicle. The rearview device 905 and rearview device housing 906 are set at an acute angle such that the rearview device 905 provides a clear rearward view to a driver of the vehicle. However, it is also contemplated that the light sensor device 908 could be centered in the rearview device assembly 904. The light sensor device 908, as illustrated, is generally recessed inside the rearview device housing 906, and does not protrude from the rearview device housing 906. However, it is also contemplated that a portion of the light sensor device 908 could protrude from the rearview device housing 906. In addition, the light sensor device 908 is provided with a viewing window 911 (FIG. 1) in a rear wall 912 (FIGS. 1 and 4) of the rearview device housing 906. The viewing window 911 is sized to accommodate a reasonable range of rotation in which the rearview device assembly 904 may be positioned. The range of rotation may be vertical rotation, horizontal rotation, or a combination of vertical and horizontal rotation.

Figure 5A:
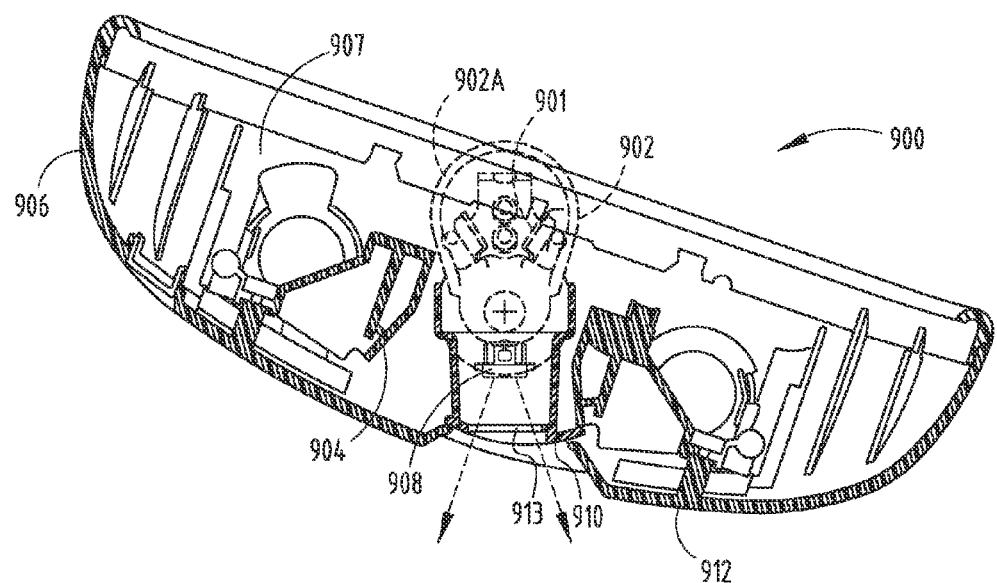
FIG. 5A is a top plan cross-sectional view of the rearview device support assembly of FIG. 5.

As illustrated, the rearview device housing 906 is adjustable laterally and vertically without changing the field of view of the light sensor device 908. Thus, the rearview device 905 can be adjusted or rotated in the direction of the driver (FIG. 5A) and also away from the driver towards the passenger (FIG. 6A). in the illustrated embodiment, the rearview device housing 906 has a lateral range of motion of +/−7.5 degrees or approximately 15 degrees, thereby accommodating adjustment of the rearview device housing 906 toward or away from the line of sight of the driver. The rearview device housing 906 is also vertically adjustable +/−6 degrees or approximately 12 degrees. It is contemplated that these angles and adjustment variabilities may be modified to accommodate users of different stature, or vehicles having varying windshields. An accessory support may be positioned below the rearview device support assembly 900 and include an electronics support platform to support any of a variety of accessories including lighting assemblies, light sensor assemblies, etc. The accessory support may connect with the rearview device housing 906 or the support member 902. A clear coverplate 913 (FIGS. 1 and 4-6A) is positioned over the viewing window 911 to protect the light sensor device 908 and prevent dust and debris from settling on the light sensor device 908. The clear coverplate 913 may be flush with the rear wall 912 of the rearview device housing 906, or may be recessed inside the rear wall 912 of the rearview device housing 906. It is also contemplated that the coverplate 913 may be absent from the rearview device housing 906.

The rearview device support assembly 900 of the present invention is configured to provide a constant forward viewing angle for the light sensor device 908, which is provided inside the rearview device housing 906, while allowing a user to adjust the angle of the rearview device assembly 904, and consequently the rearview device 905, to optimize the rearward viewing angle of the user. This construction discretely hides the light sensor device 908 generally from sight, both inside and outside the vehicle, creating an apparently seamless and aesthetically pleasing rearview device 905.

It will be understood for each of the aforementioned embodiments illustrated in FIGS. 1-6A that other constructions could also be utilized. It will also be understood that features of every embodiment disclosed herein may be used in conjunction with other embodiments disclosed herein or incorporated by reference and not specifically discussed. The disclosed embodiments are to be construed as examples and are not to be construed as limiting.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired embodiment and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

It is also to be understood that variations and modifications can be made on the aforementioned structures and methods without departing from the concepts of the present invention, and further it is to be understood that such concepts are intended to be covered by the following claims unless these claims by their language expressly state otherwise.

What is claimed is:

1. An interior rearview device support assembly comprising:
   a support member including a connecting end and a pivot end;
   a single rearview device housing defining an internal cavity and including a socket, wherein the pivot end of the support member is coupled with the socket and the single rearview device housing is pivotable relative to the stationary support member;
   a rearview device positioned in the internal cavity; and
   a sensor device disposed inside the internal cavity of the single rearview device housing directly coupled to the support member, wherein the sensor device during operation is in an un-moving position relative to the support member; and
   wherein the single rearview device housing is configured to move relative to both the support member and the sensor device.

2. The interior rearview device support assembly of claim 1, wherein the support member includes an interchangeable mount interface.

3. The interior rearview device support assembly of claim 1, wherein the support member extends through a top portion of the rearview device housing.

4. The interior rearview device support assembly of claim 1, comprising:
   an accessory support operably coupled with the support member and including an electronics support platform positioned below the rearview device housing.

5. The interior rearview device support assembly of claim 1, wherein the sensor device is a light sensor device.

6. The interior rearview device support assembly of claim 1, wherein the rearview device housing includes a rear wall with a viewing window.

7. The interior rearview device support assembly of claim 6, wherein a clear coverplate extends over the viewing window.

8. The interior rearview device support assembly of claim 1, wherein the rearview device housing is laterally rotatable approximately 15 degrees.

9. The interior rearview device support assembly of claim 8, wherein the rearview device housing is vertically rotatable approximately 12 degrees.

10. An interior rearview device support assembly comprising:
    a support member fixedly connected to a light sensor device;
    a single rearview device housing defining an internal cavity and including a socket, the support member being operably connected with the socket and the single rearview device housing is pivotable relative to the stationary support member and the light sensor device being disposed in the internal cavity of the single rearview device housing and directly coupled to the support member, wherein the sensor device during operation is in an un-moving position relative to the support member;
    wherein the single rearview device housing is configured to move relative to both the support member and the sensor device;
    a rearview device positioned in the internal cavity; and
    a viewing window disposed in the rearview device housing, such that the light sensor device can retrieve image data from outside the rearview device housing.

11. The interior rearview device support assembly of claim 10, wherein the light sensor device is recessed inside the rearview device housing.

12. The interior rearview device support assembly of claim 10, further comprising:
    a clear coverplate disposed over the viewing window.

13. The interior rearview device support assembly of claim 10, comprising:
    an accessory support operably coupled with the support member and including an electronics support platform positioned below the rearview device housing.

14. The interior rearview device support assembly of claim 10, wherein the rearview device housing is laterally rotatable approximately 15 degrees.

15. The interior rearview device support assembly of claim 10, wherein the rearview device housing is vertically rotatable approximately 12 degrees.

16. An interior rearview device support assembly comprising:
    a support member including a connecting end and a pivot end;
    a light sensor device operably connected to the support member proximate the pivot end;
    a single rearview device housing including a socket moveably coupled with the pivot end, wherein the pivot end of the support member and the light sensor device is disposed inside the single rearview device housing, wherein the sensor device during operation is in an un-moving position relative to the support member, and wherein the single rearview device housing is rotatable horizontally at least approximately 8 degrees relative to both the stationary support member and the sensor device;
    a rearview device positioned in the internal cavity;
    a viewing window disposed in the single rearview device housing proximate the light sensor device; and
    a coverplate disposed over the viewing window.

17. The interior rearview device support assembly of claim 16, wherein the support member extends through a rear portion of the rearview device housing.

18. The interior rearview device support assembly of claim 16, comprising:
    an accessory support operably coupled with the support member and including an electronics support platform positioned below the rearview device housing.

19. The interior rearview device support assembly of claim 16, wherein the rearview device housing is laterally rotatable approximately 15 degrees.

20. The interior rearview device support assembly of claim 19, wherein the rearview device housing is vertically rotatable approximately 12 degrees.

* * * * *